Sept. 14, 1926.
R. H. P. WHITE
FRICTION BRAKE
Filed Nov. 3, 1924
1,599,448
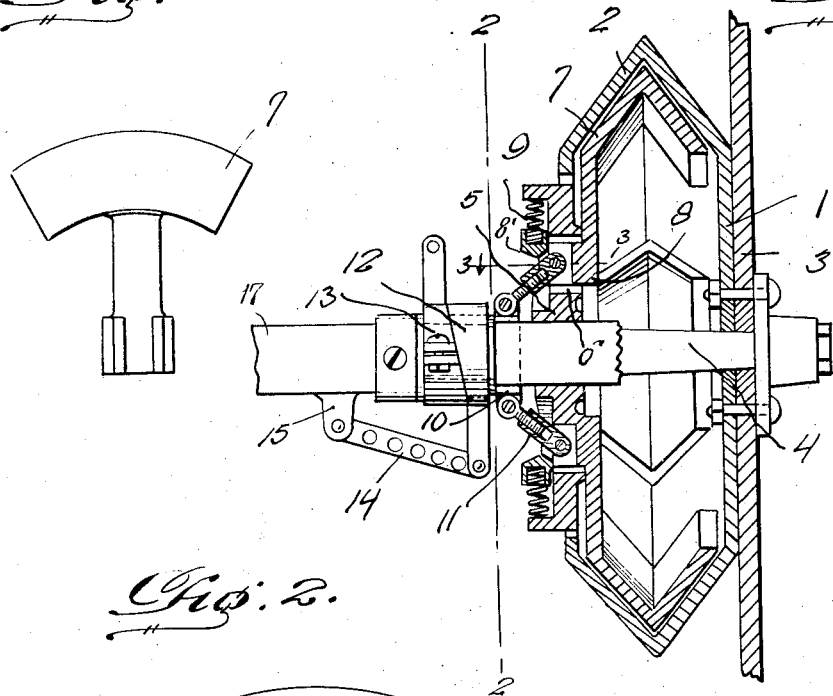
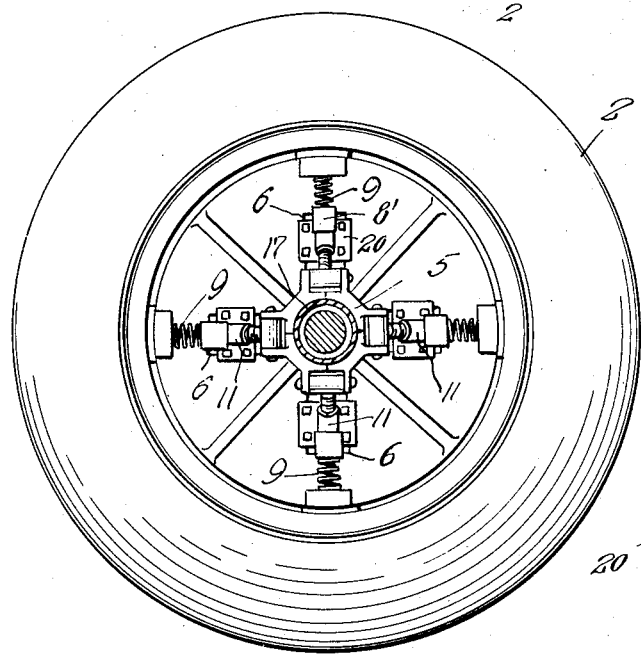
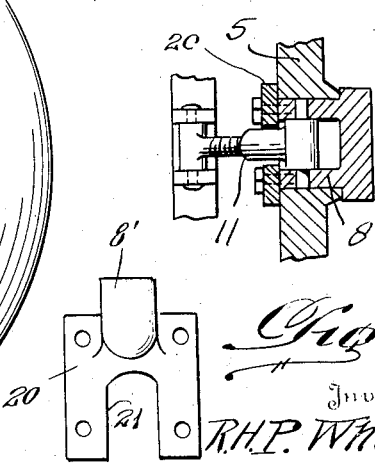
Inventor
R.H.P. White,
By Clarence A. O'Brien
Attorney Patented Sept. 14, 1926.

1,599,448

UNITED STATES PATENT OFFICE.

ROBERT H. P. WHITE, OF BATON ROUGE, LOUISIANA.

FRICTION BRAKE.

Application filed November 3, 1924. Serial No. 747,587.

This invention relates to a friction brake structure especially adapted to be used upon the wheel of an automobile machine and it consists in the novel features hereinafter described and claimed.

An object of the invention is to provide a friction brake structure of simple and durable arrangement having its parts and features so arranged and assembled that the friction shoes of the structure may be quickly and tightly forced into engagement with the friction surfaces of the casing, and may be quickly moved out of frictional engagement therewith.

In the accompanying drawing,

Figure 1 is a transverse sectional view of the friction brake.

Figure 2 is a sectional view thereof, cut on the line 2—2 of Figure 1.

Figure 3 is a detail sectional view, cut on the line 3—3 of Figure 1.

Figure 4 is a side elevation of a bracket member used in the brake structure.

Figure 5 is a side elevation of a friction shoe used in the brake mechanism.

The friction brake structure includes a casing 1 having angularly disposed side wall sections 2. The casing 1 is secured to the side of a wheel 3, which is mounted upon an axle 4 in a usual manner. A hub 5 is fixed in any suitable manner upon the axle housing member and is provided with radially disposed guide slots 6. Friction shoes 7 are located interiorly of the casing 1, and are provided with angularly disposed surfaces adapted to engage the inner surfaces of the side wall section 2 of the casing 1. The said shoes 7 are provided with shanks 8, which are slidably received in the grooves 6 of the hub 5. Springs 9 are interposed between the outer end portions of the hub 5 and brackets 8' on the shanks 8, and are under tension with a tendency to hold the shanks and the friction shoes toward the axis of the shaft 4, and out of engagement with the inner surfaces of the side wall sections 2 of the casing 1. A ring 10 is slidably mounted upon the axle housing 17 and longitudinally extensible link bolts 11 connect the ring 10 with the shank 8 of the friction shoes. The plates 20 of the brackets 8' are slotted as at 21 for terminating the swinging movement of the link bolts 11. A cam faced collar 12 is loosely mounted upon the axle housing 17 for sliding an rocking movement adjacent the ring 10, and is connected by means of a link 14 with a lug 15 which is mounted on the axle housing 17. A cam faced collar 13 is turnably mounted upon the axle housing 17, adjacent the collar 12.

Therefore, it will be seen that when the collar 13 is turned upon the axle housing 17, the collar 12 will be moved along the said axle, whereby the ring 10 is moved along the axle housing and through the link bolts 11, the friction shoes 7 are moved outwardly from the axle housing and the outer surfaces of the said shoes are forced into frictional engagement with the inner surfaces of the side wall sections 2 of the casing 1.

Having thus described my invention, what is claimed is:

A brake mechanism wherein an axle is rotatably mounted in an axle housing, comprising a casing, a brake shoe associated with the casing and provided with a shank, a hub mounted upon the axle housing and having a slot receiving the shank of the brake shoe, a spring associated with the shank and the hub to normally hold the shoe out of engagement with the casing, a ring slidable on the axle housing, a member connecting the ring with the shank, a collar having a cam edge mounted on the axle housing to slide thereon, a lug extending from the axle housing, a link connecting the lug with the collar for preventing rotation of the latter, and a second collar having a cam edge for cooperation with the cam edge of the first collar, said second collar being rotatably mounted on the axle housing, and means for preventing sliding movement of the second collar, so that when it is rotated, it will slide the first collar and the ring, and thereby force the shoe into frictional engagement with the casing.

In testimony whereof I affix my signature.

ROBERT H. P. WHITE.